April 27, 1937.　　　R. V. FOREGGER　　　2,078,567
OXYGEN EMERGENCY APPARATUS
Filed July 17, 1936
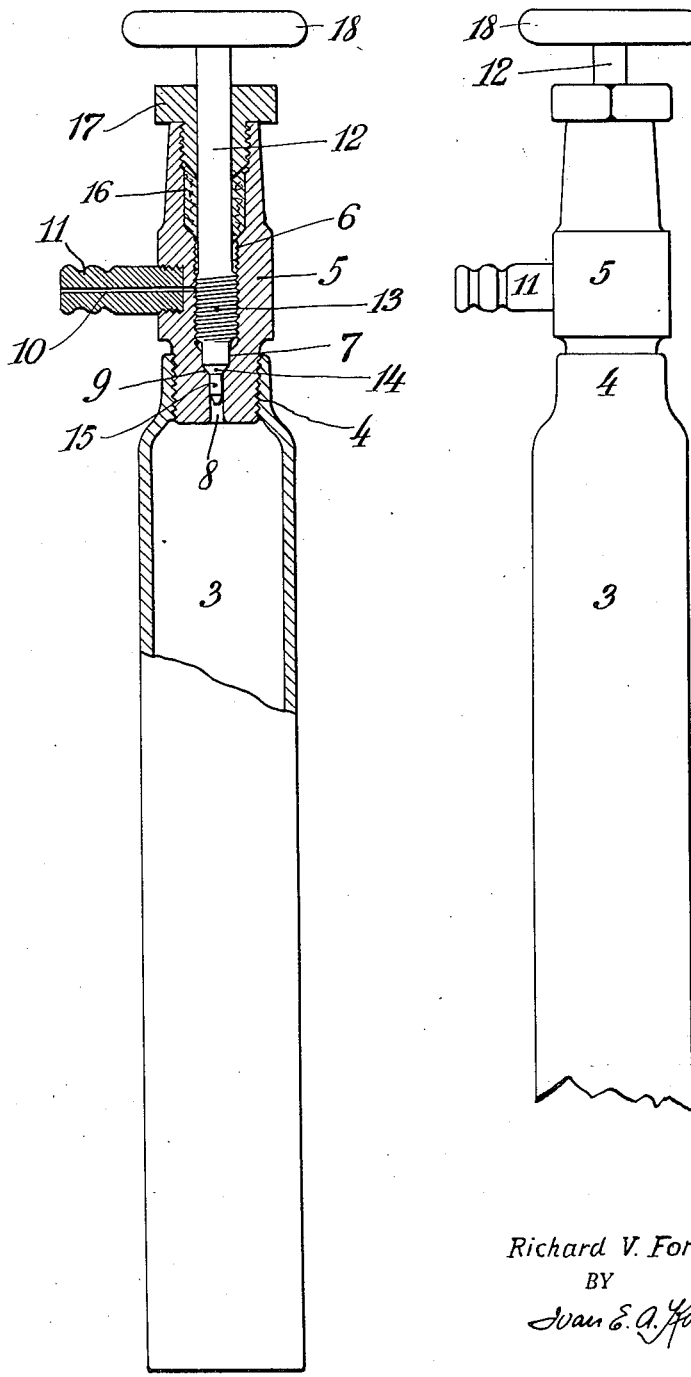
INVENTOR.
Richard V. Foregger
BY
Ivan E. A. Konigsberg
ATTORNEY Patented Apr. 27, 1937

2,078,567

UNITED STATES PATENT OFFICE 2,078,567

OXYGEN EMERGENCY APPARATUS

Richard V. Foregger, Roslyn, N. Y.

Application July 17, 1936, Serial No. 91,038

1 Claim. (Cl. 221—73.5)

The object of this invention is to provide an apparatus for administering oxygen and other gases under pressure as a part of individual inhaling devices for the relief of persons unable to withstand the effect of high altitude atmospheric pressures or who may require the administration of oxygen for other reasons.

More particularly the object of this invention is to provide an apparatus for administering oxygen and controlling the same which shall be particularly useful and suitable as equipment to be used in high altitude flying where size, weight, compactness, simplicity and sureness of control are of prime importance.

Another object of the invention is to provide a control valve of the type including a cylindrical longitudinal passage in which a valve pin is reciprocated in order to control the supply of gas passing through the valve.

With these and other objects in view the invention is embodied in any oxygen apparatus with a control valve arranged and constructed as hereinafter set forth and as illustrated in the accompanying drawing in which Figure 1 is a view of the oxygen container and valve with parts in section.

Figure 2 is a side view, partly broken away.

The apparatus herein disclosed is primarily designed for use on board airplanes employed in high altitude flying and for use with inhaling apparatus of a simple type. Under such circumstances it is necessary that the apparatus be small so as to decrease weight and size to a minimum and that a most careful leakproof control valve construction be provided including means for administering the oxygen or other gas at very low pressures.

Referring to the drawing which shows the apparatus in full size in Figure 1, the oxygen is contained in a cylinder 3 designed to contain oxygen at a pressure of say 1600–2000 pounds. The cylinder has a threaded neck 4 into which is screwed the valve body 5 which has a valve chamber comprising the threaded bore 6, a valve seat bore 7 and a cylindrical valve inlet 8. The bore 7 forms a valve seat 9. The valve chamber communicates with an outlet 10 in the tube 11 which is secured to the body and which is adapted to be connected by a rubber hose or the like to the inhaling apparatus, not shown.

The numeral 12 designates a valve stem which is threaded as at 13 for operation within the valve chamber. The stem has a reduced portion forming a conical valve seat 14 adapted to engage the valve seat 9 to close the valve. At the extreme bottom the stem ends in a valve pin 15 which has a sliding, but tight fit within the valve inlet 8. The pin 15 hugs the wall of the inlet so closely that the space therebetween cannot be observed with the naked eye. The valve chamber is closed with a suitable packing 16 and packing nut 17. The valve stem has a hand wheel 18.

Figure 1 shows the valve closed with the seat 14 screwed down upon the seat 9. When the valve stem is screwed up to open the valve, the gas from the cylinder 3 passes up through the inlet into the threaded bore 6 and leaks past the screw threads 13 into the outlet 10, the volume increasing as the valve is opened more and more. It will be noted that the proportions of the parts are such that the valve stem cannot be screwed out of the valve without removing the packing nut 17. When the valve is in its most open position, the threads 13 are still in engagement with the threaded bore 6 below the outlet 10.

The gas is therefore compelled to flow out through the minute space between the inlet 8 and the pin 15, and through the minute spaces between the threads 13 and 6. This construction prevents any sudden rush or flow of gas which might become dangerous for a patient. It insures a reduction in pressure to around 50–10 pounds as may be required. The construction is simple, very compact, and insures complete control of the supply of gas.

The apparatus is particularly well adapted for use in airplanes because it is small, of little weight and has no parts which are apt to get out of order. Because of the manner in which the gas is controlled as it flows from the tank there is no danger of over-supplying the patient with gas.

The cylinder is refilled by opening the valve and connecting the outlet 10 with a suitable refilling apparatus, not shown.

I claim:—

An apparatus of the character described comprising a cylinder for containing gas under pressure, a manually operated gas control valve secured to the cylinder in axial longitudinal relation, said valve comprising a valve body provided with a valve chamber including an interiorly threaded portion communicating at its lower end with a restricted bore forming a valve seat and a cylindrical valve inlet communicating with the said cylinder, a valve outlet communicating with the valve chamber in the threaded portion thereof a distance above the said valve seat, a valve stem within the said valve chamber in threaded engagement with the threaded portion thereof, said valve stem having a valve seat portion for engaging the valve seat aforesaid to close the valve and a cylindrical valve pin closely fitted within the said cylindrical inlet passage, the spaces between the said pin and passage and the spaces between the threads of the valve stem and the threaded portion of the valve chamber forming exclusive gas passages leading from the cylinder to the said gas outlet and a handwheel for rotating the valve stem to position the threaded portion thereof between the valve inlet and the valve outlet.

RICHARD V. FOREGGER.